United States Patent [19]

Cheng

[11] Patent Number: 6,161,169
[45] Date of Patent: Dec. 12, 2000

[54] METHOD AND APPARATUS FOR ASYNCHRONOUSLY READING AND WRITING DATA STREAMS INTO A STORAGE DEVICE USING SHARED MEMORY BUFFERS AND SEMAPHORES TO SYNCHRONIZE INTERPROCESS COMMUNICATIONS

[75] Inventor: Danny T. Cheng, San Diego, Calif.

[73] Assignee: NCR Corporation, Dayton, Ohio

[21] Appl. No.: 08/917,633

[22] Filed: Aug. 22, 1997

[51] Int. Cl.⁷ .................................................. G06F 12/00
[52] U.S. Cl. ........................... 711/150; 711/152; 711/168; 711/151
[58] Field of Search .................................. 711/150, 151, 711/152, 167, 153, 173, 154, 168

[56] References Cited

U.S. PATENT DOCUMENTS

| | | | |
|---|---|---|---|
| 4,760,518 | 7/1988 | Potash et al. | 710/107 |
| 5,590,381 | 12/1996 | Mourad | 710/52 |
| 5,615,355 | 3/1997 | Wagner | 711/167 |
| 5,652,885 | 7/1997 | Reed et al. | 713/1 |
| 5,696,933 | 12/1997 | Itoh et al. | 711/114 |
| 5,721,905 | 2/1998 | Elixmann et al. | 707/8 |
| 5,870,588 | 2/1999 | Rompaey et al. | 395/500 |
| 5,872,941 | 2/1999 | Goodrum et al. | 395/308 |
| 5,915,094 | 6/1999 | Kouloheris et al. | 345/327 |

Primary Examiner—John W. Cabeca
Assistant Examiner—Pierre-Michel Bataille
Attorney, Agent, or Firm—Gates & Cooper

[57] ABSTRACT

A method, apparatus, and article of manufacture for asynchronously writing and reading multiple data streams is disclosed. The method comprises the steps of writing a plurality of data sub-streams into shared memory buffers asynchronously and in parallel using a write process for each data stream, reading the plurality of data sub-streams from the shared memory buffers asynchronously and in parallel using a read process for each data sub-stream, and writing the data sub-stream into the storage device. Data passing between the write processes and the read processes are stored in a plurality of shared memory buffers, with access to the shared memory buffers controlled by semaphores. The semaphores are used to write-block a shared memory buffer to render the buffer inaccessible to other write processes, to write-unblock a next available shared memory buffer to render it available to a next write process, to read-block the shared memory buffer, to write the data sub-stream to the shared memory buffer, and to read-unblock the shared memory buffer. This allows the bandwidth of the storage devices to be more fully utilized, and improves I/O throughput. The apparatus comprises a system for performing these operations, and the article of manufacture comprises a computer-readable program storage medium tangibly embodying the above method steps.

27 Claims, 4 Drawing Sheets

METHOD AND APPARATUS FOR ASYNCHRONOUSLY READING AND WRITING DATA STREAMS INTO A STORAGE DEVICE USING SHARED MEMORY BUFFERS AND SEMAPHORES TO SYNCHRONIZE INTERPROCESS COMMUNICATIONS

BACKGROUND OF THE INVENTION

1. Field of the Invention

This invention relates in general to writing data to storage devices, and in particular, to a method, apparatus, and article of manufacture for asynchronously and in parallel writing multiple of data streams into a storage device, using shared memory buffers.

2. Description of Related Art

During the execution of a computer program, data streams are written into or read from storage devices (e.g., tape drives and hard disks) serially. A data stream is all the data transmitted through a data channel in a single read or write operation.

Conventional read/write techniques for data streams usually result in an inefficient use of the data storage device and a longer throughput. Moreover, the bandwidth of a data storage device is frequently underutilized because the fastest rate attainable by a single computer program writing to or reading from a data storage device is usually less than the device bandwidth. Therefore, there is a need in the art for modifications to conventional techniques that increase the throughput of the storage device and thus improve the throughput of the system.

SUMMARY OF THE INVENTION

To overcome the limitations in the prior art described above, and to overcome other limitations that will become apparent upon reading and understanding the present specification, the present invention discloses a method, apparatus, and article of manufacture for asynchronously and in parallel writing multiple data streams into one or more storage devices, which results in an increase of the device throughput.

A single data stream is divided up into a plurality of smaller data sub-streams that run in parallel. The smaller data sub-streams may be of equal size or different size. In the alternative, the data may already be in the form of a plurality of data sub-streams that run in parallel. The plurality of data sub-streams are then written into shared memory buffers asynchronously and in parallel. The data sub-streams are then read from the shared memory buffers asynchronously and in parallel, wherein the reading step is simultaneous and independent of the writing step.

Finally, the data sub-streams are written into the storage device.

An object of the present invention is to improve the throughput and utilize the full bandwidth of storage devices. This object is achieved through asynchronously writing multiple data streams into one or more storage devices in parallel using shared memory buffers. This feature also provides the benefits of asynchronous I/O, simple load balancing, and buffering to increase performance, i.e., reading a data stream from a buffer while another buffer is being written with another data stream.

One advantage of the present invention is its ability to perform read/write functions for storage devices in a significantly shorter time. This advantage is a result of multiple write processes and multiple read processes running asynchronously and in parallel. The write and read processes use shared memory buffers to communicate among each other and semaphores are used to synchronize the interprocess communications.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

HARDWARE ENVIRONMENT

Figure 1:
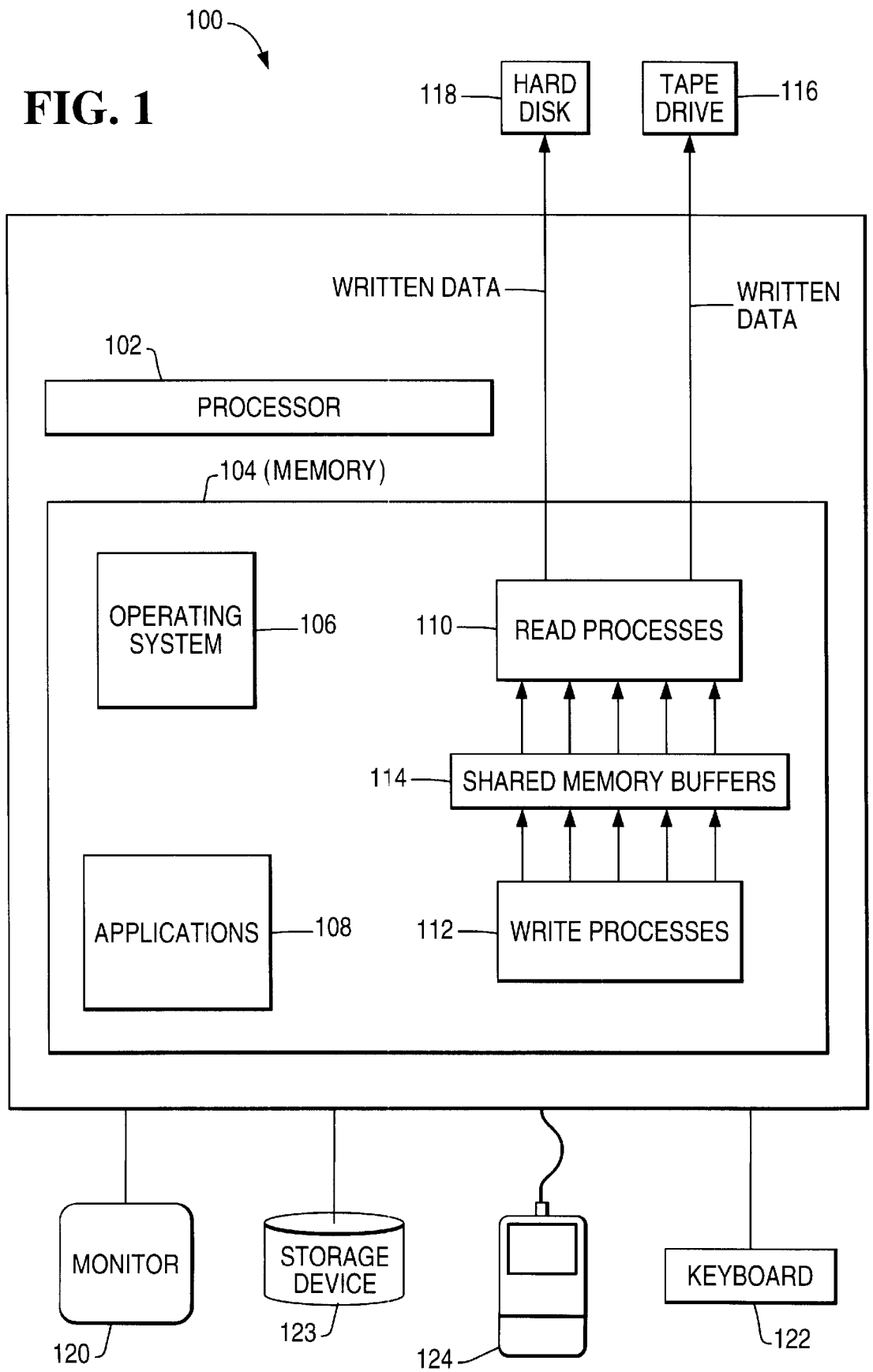
FIG. 1 is a block diagram that illustrates an exemplary hardware environment for the present invention.

FIG. 1 illustrates an exemplary computer hardware environment that may be used with the present invention. In the exemplary computer hardware environment, a computer system 100 is comprised of a processor 102, a memory 104, an operating system 106, and one or more application programs 108. Within the memory 104, there are shared memory buffers 114, read processes 110, and write processes 112. A tape drive 116 and a hard disk 118 are also included in the environment. Keyboard 122 and mouse 124 are used to input commands and/or data into the computer system and monitor 120 is used to display data. The read processes 110 and write processes 112 can be used with an application program 108 that needs to access the tape drive 116 or the hard disk 118. They can also be used by a utility program that runs under the operating system 106 that needs to access the tape drive 116 or the hard disk 118. The write processes 112 write data streams to the shared memory buffers 114 and the read processes 110 read data streams from the shared memory buffers 114 independent of and simultaneous to each other.

Generally, the computer system 100 operates under control of the operating system 106 stored in the memory 104. In an exemplary embodiment, the operating system 106 or the computer application programs comprise one or more data structures and computer programs consisting of instructions which, when read and executed by the processor 102, cause the read processes 110 and the write processes 112 to execute the steps or elements of the present invention. The instructions performing the present invention may be tangibly embodied in a computer-readable medium, e.g. data storage device 123, which could include one or more fixed or removable data storage devices, such as a removable cartridge drive, floppy disc drive, hard drive, CD-ROM drive, tape drive, etc.

In one embodiment of the present invention, semaphores ensure proper access of the shared memory buffers 114 and provide coordination and synchronization between the read processes 110 and the write processes 112. This method has the following advantages: parallelism, asynchronous I/O, simple load balancing, and buffering to boost performance (e.g., writing a data stream to one buffer while reading another data stream from another buffer at the same time).

OVERVIEW

The present invention provides an efficient yet simple mechanism for performing asynchronous parallel write functions using shared memory buffers and semaphores.

The present invention divides up a single application (data stream) into many smaller applications (data sub-streams) running in parallel to significantly increase data throughput. For example, if the fastest rate attainable by a single application writing to a tape drive is 1 MB/sec, but the bandwidth of the tape drive is 5 MB/sec, the application is not effectively using the tape drive. When the single application is divided into five smaller applications running asynchronously and in parallel, the tape drive will be effectively utilized at its rated capacity of 5 MB/sec. Additionally, the application is completed in one-fifth of the time.

Figure 2:
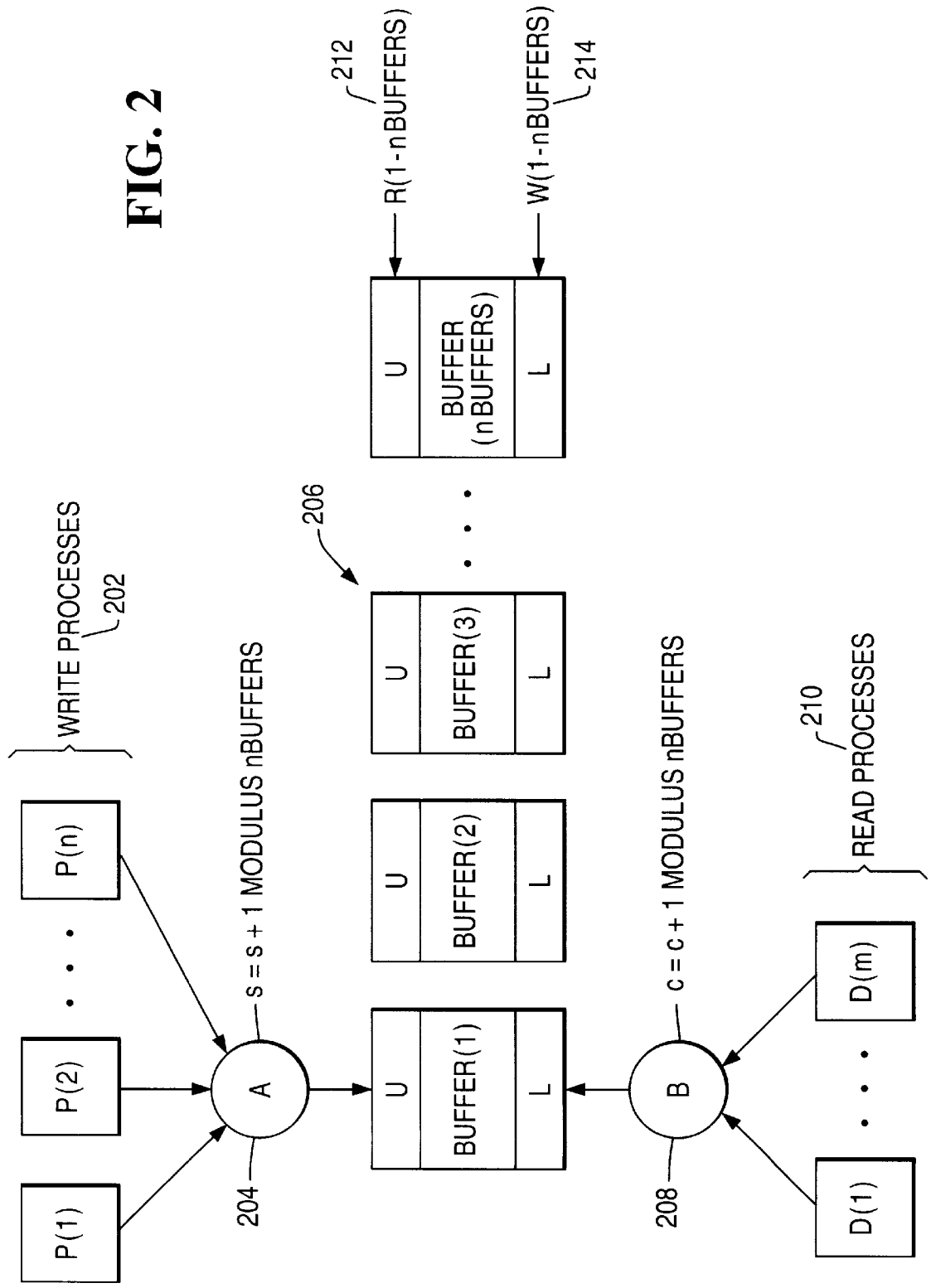
FIG. 2 is a block diagram that illustrates the components of one embodiment of the present invention.

FIG. 2 is a block diagram that illustrates the operation of one embodiment of the present invention. The write processes P[●] 202 and the read processes D[●] 210 run simultaneously and independently. The write processes P[●] 202 use a global semaphore (A) 204 to control access to the shared memory buffers 206. The global semaphore (A) 204 blocks a shared memory buffer 206 (hereinafter, a specific buffer is referred to in capitalized form as "Buffer") from a premature write by other write processes 202 while it is being written to by a write process 202. All the write processes P[●] 202 write data into the shared memory buffers 206, wherein the next free shared memory buffer is selected in a round robin fashion while running in parallel and asynchronously. A round robin process scheduling method selects the next available shared memory buffer sequentially. This is illustrated in FIG. 2 as "s=s+1 modulus number of buffers," i.e., after the last Buffer (Buffer[n]) is selected, the next selected Buffer would be Buffer[1]. The variable s in semaphore (A) 204 designates an available (blocked) Buffer for writing. Other process selection and scheduling policies can also be used to accomplish the step of selecting a next available Buffer as well.

Similarly, all the read processes D[●] 210 use global semaphore (B) 208 to control access to the shared memory buffers 206. The global semaphore (B) 208 blocks a Buffer from a premature read by other read processes 210 while it is being read by a read process. All the read processes D[●] 210 read data from the shared memory buffers 206, wherein the next free shared memory buffer is selected in a round robin fashion while running in parallel and asynchronously. This is indicated in FIG. 2 as "c=c+1 modulus number of buffers," i.e., after the last Buffer (Buffer[n]) is selected, the next selected Buffer would be Buffer[1]. The variable c in semaphore (B) 208 designates an available (blocked) Buffer for reading. Other process selection and scheduling policies can also be used to accomplish the step of selecting a next available Buffer as well.

Write processes P[●] 202 and read processes D[●] 210 use semaphores R[●] 212 and W[●] 214 to control access to a particular Buffer between a write process P[i] and a read process D[j], wherein (i) may be any integer number between 1 and n, and (j) may be any integer number between 1 and m. Semaphore R[i] is set to a lock position by a write process P[i] before writing to a Buffer[i] to prevent a read process D[j] from prematurely reading the data from the Buffer[i]. Semaphore W[j] is set to a lock position by a read process D[j] before reading from Buffer[j] to prevent a write process P[i] from prematurely writing new data to the Buffer[j]. However, other arrangements of semaphores may also be used to accomplish the steps of locking and unlocking a selected shared memory buffer. For example, the R[●] semaphore and the W[●] semaphore can be combined into one semaphore. Once a semaphore is locked, any further locks applied by the original or other processes will be blocked until the semaphore is unlocked. This may occur from the original process or another process.

WRITE PROCESS

Figure 3:
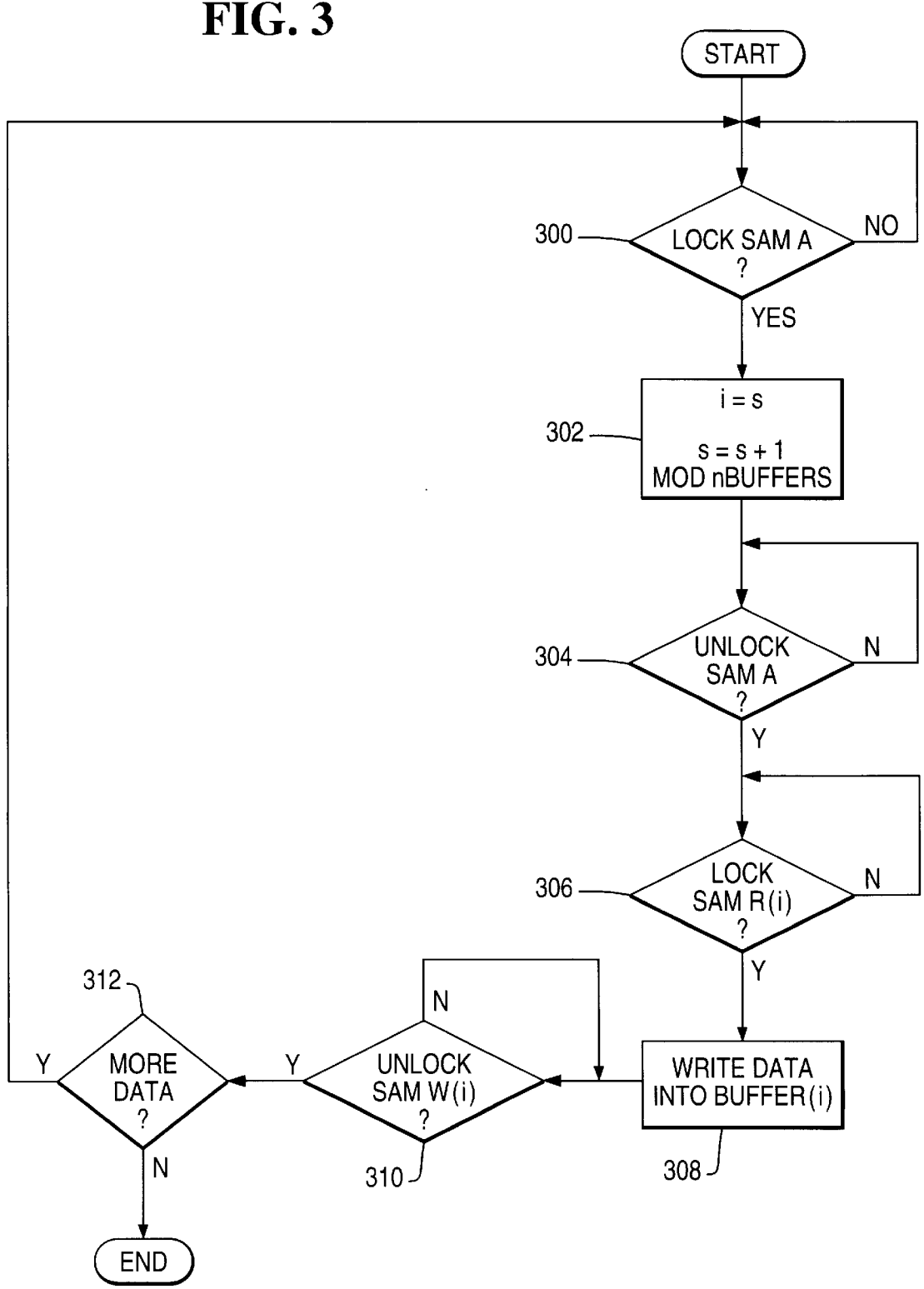
FIG. 3 is a flowchart illustrating the steps performed by the write process of the present invention.

FIG. 3 is a flowchart that illustrates the steps performed by a write process. All the write processes P[1]–P[n] write data into the shared memory buffers selected in a round robin fashion while running asynchronously and in parallel. Semaphore (A) is used to prevent two or more write processes trying to write to the same Buffer[i] by locking the semaphore (A) when the Buffer is being written to and unlocking it when the writing process is completed. The W[i] and R[i] semaphores prevent premature access to Buffer[i] by a read process if the writing of the Buffer[i] is not completed by the write process P[i].

As shown in block 300, the write process begins by locking the semaphore (A) for the available Buffer[i]. This prevents other write processes from locking the same Buffer [i]. Next, the index of the available Buffer[i] is set to the locked semaphore (s) to select the locked Buffer[i] for writing and thereupon the semaphore index (s) is incremented (in a round robin fashion) for a next available Buffer. This is shown in block 302. Then, the next available Buffer for writing is unlocked so that the next write process can access it, as indicated in block 304. Thereafter, semaphore R[i] is locked to prevent any premature reading, if the selected Buffer[i] has not yet been read (by a read process). This is illustrated in block 306. Subsequently, as shown by block 308, a data stream is written to Buffer[i] by the write process P[i]. Next, semaphore W[i] is unlocked to let a read process know that the Buffer[i] is filled and is ready to be read. This is illustrated in block 310. Finally, if there is more data, the next available Buffer[i+1] is selected for writing the data into and the above steps are repeated. This is shown in block 312.

READ PROCESS

Figure 4:
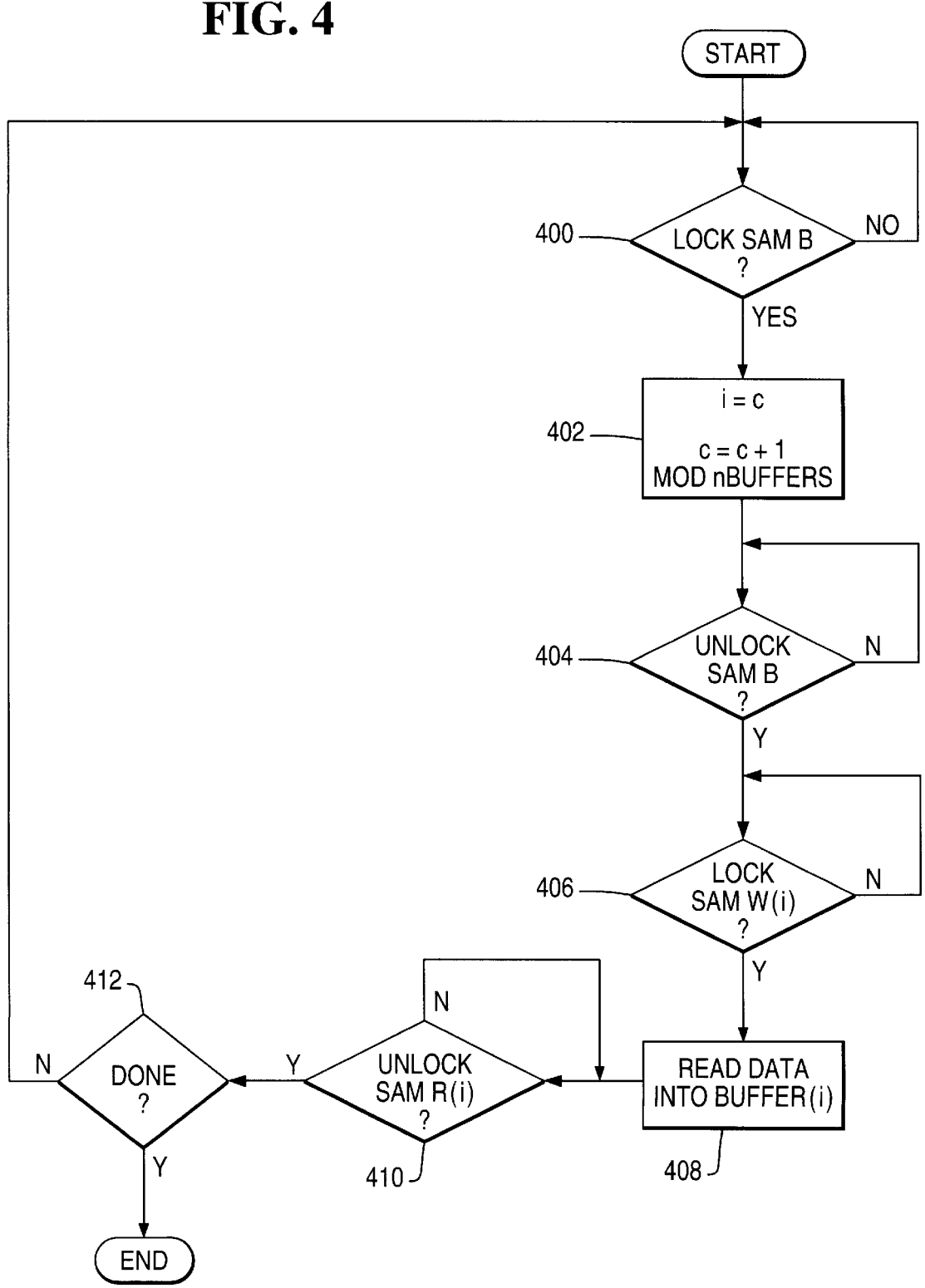
FIG. 4 is a flowchart illustrating the steps performed by the read process the present invention.

FIG. 4 is a flowchart that illustrates the steps performed by a read process. All the read processes D[1]–D[m] read the shared memory buffers in a round robin fashion running asynchronously and in parallel. This is independent of and simultaneous to the write processes. Semaphore (B) allows only one read process D[j] at a time to access a Buffer[j]. The R[j] and W[j] semaphores prevent premature access to Buffer[j] by a write process if the Buffer[j] is not completely read by the read process D[j].

As shown in block 400, the read process begins by locking the semaphore (B). This prevents other read processes from locking the same Buffer[j]. Next, the index of the available Buffer[j] is set to the locked semaphore (c) to select the locked Buffer for reading and thereupon the semaphore index (c) is incremented (in a round robin fashion) for a next available Buffer to be read. This is illustrated in block 402. Then, the next available Buffer to be read is unlocked so that the next read process can access it, as indicated in block 404. Thereafter, semaphore W[j] is locked to prevent any premature writing, if the selected Buffer[j] has not yet been written into with new data (by a write process). This is shown in block 406. Subsequently, as indicated by block 408, a data stream is read from Buffer[j] by the read process D[j]. Next, semaphore R[j] is unlocked to let a write process know that the Buffer[j] is read and is ready to be written into with new data. This is shown in block 410. Finally, if there is more data to be read, the next available Buffer[j+1] is read and the above steps are repeated. This is illustrated in block 412.

CONCLUSION

This concludes the description of the preferred embodiment of the invention for a method, apparatus, and article of manufacture for asynchronously and in parallel writing multiple data streams into one or more storage devices, which results in an increase of the device throughput.

A single data stream is divided up into a plurality of smaller data sub-streams that run in parallel, and may be of equal size or different size. In the alternative, the data may already be in the form of a plurality of data sub-streams that run in parallel. The plurality of data sub-streams are then written into shared memory buffers asynchronously and in parallel. The data sub-streams are then read from the shared memory buffers asynchronously and in parallel, wherein the reading step is simultaneous and independent of the writing step.

Finally, the data sub-streams are written into the storage device.

Using the teachings presented herein, the present invention can be practiced in many different embodiments. For example, any type of computer, such as a mainframe, minicomputer, or personal computer, could be used to implement the present invention. In addition, other I/O read/write functions that can be asynchronously paralleled could benefit from the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for asynchronously writing data into a storage device, executed on a computer having a plurality of shared memory buffers, the method comprising the steps of:

writing the data comprising a plurality of data sub-streams into the shared memory buffers asynchronously and in parallel using a write process for each data sub-stream;

reading the plurality of data sub-streams from the shared memory buffers asynchronously and in parallel using a read process for each data sub-stream, wherein the read processes are executed independent of and simultaneous to the write processes;

writing the data sub-streams into the storage device; and wherein the write process for each data sub-stream comprises the steps of selecting an available shared memory buffer for the write process;

write-blocking the selected shared memory buffer, wherein the selected shared memory buffer is not accessible to other write processes executing in parallel;

write-unblocking a next available shared memory buffer, wherein the next available shared memory buffer is accessible to a next write process;

read-blocking the selected shared memory buffer, wherein the selected shared memory buffer is not accessible to any read process;

writing the data sub-stream into the selected shared memory buffer; and read-unblocking the selected shared memory buffer to make it accessible to any read process.

2. The method of claim 1, further comprising the step of dividing the data into the plurality of data sub-streams.

3. The method of claim 1, wherein the available shared memory buffer is selected using round robin process scheduling.

4. The method of claim 1, wherein the write-blocking and write-unblocking steps comprise the steps of locking and unlocking a semaphore to control access to the selected shared memory buffer by other write processes while the selected shared memory is being written to.

5. The method of claim 1, wherein the read-blocking and read-unblocking steps comprise the steps of locking and unlocking a semaphore to control access to the selected shared memory buffer by other read processes while the selected shared memory is being written to.

6. The method of claim 1, wherein the read process for each data sub-stream comprises the steps of:

selecting an available shared memory buffer for the read process;

read-blocking the selected shared memory buffer, wherein the selected shared memory buffer is not accessible to other read processes executing in parallel;

read-unblocking a next available shared memory buffer, wherein the next available shared memory buffer is accessible to a next read process;

write-blocking the selected shared memory buffer, wherein the selected shared memory buffer is not accessible to any write process;

reading the data sub-stream from the selected shared memory buffer; and write-unblocking the selected shared memory buffer to make it accessible to any write process.

7. The method of claim 6, wherein the available shared memory buffer is selected using round robin process scheduling.

8. The method of claim 6, wherein the read-blocking and read-unblocking steps comprise the steps of locking and unlocking a third semaphore to control access to the selected shared memory buffer by other read processes while the selected shared memory is being read.

9. The method of claim 6, wherein the write-blocking and write-unblocking steps comprise the steps of locking and unlocking a semaphore to control access to the selected shared memory buffer by other write processes while the selected shared memory is being read.

10. The method of claim 1, wherein the data sub-streams are of substantially equal size.

11. The method of claim 1, wherein the storage device is a tape drive.

12. The method of claim 1, wherein the storage device is a hard disk.

13. An apparatus for asynchronously writing a data stream into a storage device by a computer program, comprising:

a computer having a plurality of shared memory buffers;

means, performed by the computer, for dividing the data stream into a plurality of data sub-streams;

means, performed by the computer for writing the plurality of data sub-streams into the shared memory buffers asynchronously and in parallel;

means, performed by the computer, for reading the plurality of data sub-streams from the shared memory buffers asynchronously and in parallel;

means, performed by the computer, for writing the data sub-streams into the storage device; and wherein the means for writing each data sub-stream further comprises means, performed by the computer for selecting an available shared memory buffer for the writing process;

means, performed by the computer, for blocking the selected shared memory buffer, wherein the selected shared memory buffer is not accessible to other write processes executing in parallel;

means, performed by the computer, for unblocking a next available shared memory buffer, wherein the next available shared memory buffer is accessible to a next write process;

means, performed by the computer, for blocking the selected shared memory buffer, wherein the selected shared memory buffer is not accessible to a read process;

means, performed by the computer, for writing the data sub-stream into the selected shared memory buffer; and means, performed by the computer, for unblocking the selected shared memory buffer to make it accessible to a read process.

14. An apparatus according to claim 13, wherein the means for reading each data sub-stream further comprises:

means, performed by the computer, for selecting an available shared memory buffer for the reading process;

means, performed by the computer, for blocking the selected shared memory buffer, wherein the selected shared memory buffer is not accessible to other read processes executing in parallel;

means, performed by the computer, for unblocking a next available shared memory buffer, wherein the next available shared memory buffer is accessible to a next read process;

means, performed by the computer, for blocking the selected shared memory buffer, wherein the selected shared memory buffer is not accessible to a write process;

means, performed by the computer, for reading the data sub-stream from the selected shared memory buffer; and means, performed by the computer, for unblocking the selected shared memory buffer to make it accessible to a write process.

15. The apparatus of claim 14, wherein the available shared memory buffer is selected according to round robin processing.

16. The apparatus of claim 14, wherein means for blocking and unblocking the selected shared memory buffer wherein the selected shared memory buffer is not accessible to other read processes executing in parallel comprises a semaphore controlling access to the selected shared memory buffer by other write processes while the selected shared memory buffer is being written to.

17. The apparatus of claim 14, wherein means for blocking and unblocking the selected shared memory buffer wherein the selected shared memory buffer is not accessible to a write process comprises a semaphore controlling access to the selected shared memory buffer by other write processes while the selected shared memory buffer is being written to.

18. An article of manufacture comprising a program storage medium readable by a computer having shared memory buffers and embodying one or more instructions executable by the computer to perform method steps for asynchronously writing a data stream into a storage device, the method comprising the steps of:

dividing the data stream into a plurality of data sub-streams;

writing the plurality of data sub-streams into the shared memory buffers asynchronously and in parallel using a write process for each data sub-stream;

reading the plurality of data sub-streams from the shared memory buffers asynchronously and in parallel using a read process for each data sub-stream, wherein the read processes are executed independent of and simultaneous to the write processes;

writing the data sub-streams into the storage device; and wherein the write process for each data sub-stream comprises the steps of selecting an available shared memory buffer for the write process;

write-blocking the selected shared memory buffer, wherein the selected shared memory buffer is not accessible to other write processes executing in parallel;

write-unblocking a next available shared memory buffer, wherein the next available shared memory buffer is accessible to a next write process;

read-blocking the selected shared memory buffer, wherein the selected shared memory buffer is not accessible to any read process;

writing the data sub-stream into the selected shared memory buffer; and read-unblocking the selected shared memory buffer to make it accessible to any read process.

19. An article of manufacture according to claim 17, wherein the read process for each data sub-stream comprises the steps of:

selecting an available shared memory buffer for the read process;

read-blocking the selected shared memory buffer, wherein the selected shared memory buffer is not accessible to other read processes executing in parallel;

read-unblocking a next available shared memory buffer, wherein the next available shared memory buffer is accessible to a next read process;

write-blocking the selected shared memory buffer, wherein the selected shared memory buffer is not accessible to any write process;

reading the data sub-stream from the selected shared memory buffer; and write-unblocking the selected shared memory buffer to make it accessible to any write process.

20. The article of manufacture of claim 19, wherein the read-blocking and read-unblocking steps comprise the method steps of locking and unlocking a semaphore to control access to the selected shared memory buffer by other read processes while the selected shared memory is being read.

21. The article of manufacture of claim 19, wherein the write-blocking and write-unblocking steps comprise the method steps of locking and unlocking a semaphore to control access to the selected shared memory buffer by other write processes while the selected shared memory is being read.

22. The article of manufacture of claim 18, wherein the write-blocking and write-unblocking steps comprise the method steps of locking and unlocking a semaphore to control access to the selected shared memory buffer by other write processes while the selected shared memory is being written to.

23. The article of manufacture of claim 18, wherein the read-blocking and read-unblocking steps comprise the method steps of locking and unlocking a semaphore to control access to the selected shared memory buffer by other read processes while the selected shared memory is being written to.

24. A method for asynchronously writing data into a storage device, executed on a computer having a plurality of shared memory buffers, the method comprising the steps of:

writing the data comprising a plurality of data sub-streams into the shared memory buffers asynchronously and in parallel using a write process for each data sub-stream;

reading the plurality of data sub-streams from the shared memory buffers asynchronously and in parallel using a read process for each data sub-stream, wherein the read processes are executed independent of and simultaneous to the write processes;

writing the data sub-streams into the storage device; and wherein the read process for each data sub-stream comprises the steps of selecting an available shared memory buffer;

read-blocking the selected shared memory buffer, wherein the selected shared memory buffer is not accessible to other read processes executing in parallel;

read-unblocking a next available shared memory buffer, wherein the next available shared memory buffer is accessible to a next read process;

write-blocking the selected shared memory buffer, wherein the selected shared memory buffer is not accessible to any write process;

reading the data sub-stream from the selected shared memory buffer; and write-unblocking the selected shared memory buffer to make it accessible to any write process.

25. The method of claim 24, further comprising the step of dividing the data into plurality of data sub-streams.

26. The method of claim 25, wherein the available shared memory buffer is selected using round robin process scheduling.

27. An apparatus for asynchronously writing a data stream into a storage device by a computer program, comprising:

a computer having a plurality of shared memory buffers;

means, performed by the computer, for dividing the data stream into a plurality of data sub-streams;

means, performed by the computer for writing the plurality of data sub-streams into the shared memory buffers asynchronously and in parallel;

means, performed by the computer, for reading the plurality of data sub-streams from the shared memory buffers asynchronously and in parallel;

means, performed by the computer, for writing the data sub-streams into the storage device; and wherein the read process for each data sub-stream comprises the steps of selecting an available shared memory buffer;

read-blocking the selected shared memory buffer, wherein the selected shared memory buffer is not accessible to other read processes executing in parallel;

read-unblocking a next available shared memory buffer, wherein the next available shared memory buffer is accessible to a next read process;

write-blocking the selected shared memory buffer, wherein the selected shared memory buffer is not accessible to any write process;

reading the data sub-stream from the selected shared memory buffer; and write-unblocking the selected shared memory buffer to make it accessible to any write process.

* * * * *